(12) United States Patent
Lausell

(10) Patent No.: US 8,651,446 B2
(45) Date of Patent: Feb. 18, 2014

(54) PC TABLET HOLDER AND METHOD OF USE THEREOF

(76) Inventor: Emiliano Lausell, Caguas, PR (US)

(*) Notice: Subject to any disclaimer, the term of this patent is extended or adjusted under 35 U.S.C. 154(b) by 283 days.

(21) Appl. No.: 13/279,317

(22) Filed: Oct. 23, 2011

(65) Prior Publication Data

US 2013/0098852 A1    Apr. 25, 2013

(51) Int. Cl.
   *A47B 23/04*   (2006.01)
(52) U.S. Cl.
   CPC .............. *A47B 23/04* (2013.01); *A47B 23/041* (2013.01)
   USPC ........ 248/465.1; 248/444; 248/452; 248/453; 248/455
(58) Field of Classification Search
   USPC .............. 248/465.1, 444, 452, 453, 451, 454, 248/455, 460, 440.1, 175, 188.7
   See application file for complete search history.

(56) References Cited

U.S. PATENT DOCUMENTS

| 648,742 | A | * | 5/1900 | Hassellund et al. | 248/444 |
|---|---|---|---|---|---|
| 1,389,700 | A | * | 9/1921 | Rodow | 248/444 |
| 1,655,004 | A | * | 1/1928 | Yurachek | 248/452 |
| 2,064,232 | A | * | 12/1936 | Tepper | 248/452 |
| 2,244,773 | A | * | 6/1941 | Everett | 248/451 |
| 2,596,302 | A | * | 5/1952 | Squyres | 248/452 |
| 2,908,465 | A | * | 10/1959 | Lykes | 248/445 |
| 2,984,443 | A | * | 5/1961 | Bergengren | 248/124.2 |
| 3,147,949 | A | * | 9/1964 | Webster | 248/463 |
| 3,416,764 | A | * | 12/1968 | Bier | 248/452 |
| 4,690,363 | A | * | 9/1987 | Koves | 248/449 |
| 4,726,556 | A | * | 2/1988 | Weir | 248/454 |
| 4,856,749 | A | * | 8/1989 | Habermann | 248/448 |
| 5,161,766 | A | * | 11/1992 | Arima | 248/447 |
| 5,662,303 | A | * | 9/1997 | Rellinger et al. | 248/448 |
| 6,202,973 | B1 | * | 3/2001 | Navarin et al. | 248/444 |
| 7,832,701 | B2 | * | 11/2010 | Barnes | 248/460 |
| 2008/0023594 | A1 | * | 1/2008 | Weder | 248/27.8 |
| 2009/0140119 | A1 | * | 6/2009 | To et al. | 248/455 |

* cited by examiner

*Primary Examiner* — Michael Safavi

(57) ABSTRACT

A pc tablet holder for suspending pc tablets above the mid-body section of a user lying on bed with the back against the headboard. The holder has a tripod configuration with front legs made from a resilient elongated round bent in inverted "U"-shape and held in position by a string. A rear leg is connected to the "U"-shape's vertex by a retainer. A top clamping element, having a surface to catch the pc tablet's top edge, is carried at the "U"-shape's vertex. A bottom clamping element, having a space to receive the pc tablet's bottom edge, is carried by the string. The holder is placed on the bed with front legs across the user's mid-body section and the rear leg adjacent the user's crotch area. A pc tablet is removably clamped between the top and bottom clamping elements, achieving a hands-free holding of the pc tablet.

20 Claims, 14 Drawing Sheets

PC TABLET HOLDER AND METHOD OF USE THEREOF

CROSS REFERENCE TO RELATED APPLICATIONS

Not Applicable

FEDERALLY SPONSORED RESEARCH

Not Applicable

SEQUENCE LISTING

Not Applicable

BACKGROUND OF THE INVENTION

1. Field of Invention

This invention relates to pc tablet holders, specifically to pc tablet holders to be used for bedtime reading.

2. Prior Art

Pc tablet holders are designed to be portable and to provide a hands-free holding of the pc tablet for comfortable screen view and touch screen operation. However, many of the commercially available pc tablet holders aren't designed for bedtime reading. Those that may be used for bedtime reading need to be placed on the user's lap, interfering with the user's mobility of the legs and knees and falling short in providing an eye-level-holding of the pc tablet for comfortable viewing. Others that do suspend a pc tablet above the user's mid-body section at the user's eye level have bases that need to be placed on the floor requiring long support members rendering them more bulky, less portable, and pricier to the consumer. With the use of pc tablets as electronic book readers and the wide spread bedtime reading and bedtime internet browsing habits of an increasingly number of people, manufacturers are looking for ways to develop holders that can be used for bedtime reading or internet browsing, that provides a comfortable, hands-free, eye-level holding of the pc tablet without losing comfort, portability and at an affordable cost to the user.

U.S. Pat. No. 5,607,135 to Yamada (1997), U.S. Pat. No. 6,508,451 B1 to Blythe et al. (2003), U.S. Pat. No. 6,967,836 B2 to Huang et al. (2005), U.S. Pat. No. 7,762,519 B2 to Kunii et al. (2010), U.S. Pat. No. 7,712,719 B2 to Deny et al. (2010), U.S. Pat. No. 7,861,995 B2 to Liou (2011), U.S. Pat. No. 7,916,468 B2 to Takizawa (2011), U.S. Pat. No. 7,969,732 B1 to Noble (2011), and U.S. Pat. No. 8,020,818 B2 to Chou et al. (2011) show electronic device stands whose main purpose is to solve the problem of accessibility of the operating buttons and the visual display of the electronic device when placed flat on a desktop. Some of them are easy to use (Yamada's, Liou's), inexpensive to make (Yamada's, Liou's), and compact and easily portable (Liou's, Derry's, Chou's, Kunii's) and some can even be used to support the electronic device on an upstanding wall (Blythe's) or to carry the electronic device inside the holder (Huang's). While achieving their intended purposes the design of these electronic device holders can be classified into two categories: one, those whose base makes them stable only when placed on a flat surface, and two, those whose ample base allows placing them on the user's lap providing a reasonable amount of stability. The holders that can not be placed on a user's lap either have very narrow bases (Noble's and Liou's) or have individual legs (Kunii's, Blythe's, Chou's, and Derry's) that would cause them, and the pc tablet, to trip back or sideways if placed on a user's lap for bedtime reading. The holders that can be placed on a user's lap for bedtime reading providing a reasonable degree of stability (Takisawa's, Huang's, and Yamada's) would restrict the user's legs mobility. All of these electronic device holders when placed on a user's lap or on the sitting surface will require the user's head to be tilted down in order to look at, and interact with, the pc tablet's touch screen. The restriction of the user's legs mobility and the need to tilt the head down becomes, after a while, very uncomfortable. What is needed is a pc tablet holder for bedtime reading that need not to be placed on the user's lap so it isn't too restrictive on the user's mobility and that can support the pc tablet near the user's eye-level so the user need not to tilt the head down to look at and interact with the pc tablet's touch screen.

U.S. Pat. No. 4,431,156 to Mena (1984), U.S. Pat. No. 4,718,630 to Richard (1988), and U.S. Pat. No. 7,559,522B1 to Hlatky (2009) show book holding devices meant for in-bed reading. Due to the book-like size of the new pc tablets in the market and the fact that many of these pc tablets are mainly used for reading electronic books, these book holders could be used to hold the pc tablet for reading and are, therefore, evaluated in this application.

Mena's device for reading in bed is a rack placed over the reader's head while the reader is lying in bed in a supine position. The rack has an inclined transparent surface upon which the book is placed face down so it can be read by the user who is facing up with the head right underneath the holder.

The use of Mena's device as a pc tablet holder would allow the viewing of the pc tablet screen but would not allow the interaction with the pc tablet's touch screen.

Richard's device is in essence a portable table with a transparent inclined surface that can be used to support a book or as a lap writing surface. Similar to Mena's device it can be used to read a book, while in bed, in a supine position and would have the same limitations as Mena's device when used with a pc tablet.

Richards' device, however, can also be used to read a book while sitting on a bed with the back of the user against the head board or against the pillows. In this case the table is placed over the reader's lap and the book rests on the table's inclined surface at a height below the user's eye-level. In this configuration of Richard's device the movement of the user's knees is limited to the clearance between the knees with extended legs and the underneath of the table, which is tight in most cases, limiting the user's comfort if the user wants to bring the knees up or cross one leg over the other.

Hlatky's hospital bed book holder is a multi layer tray system specifically for use on a hospital bed which has side rails upon which hooks, on the lateral edges of the book holder, are mounted. Although this design brings the book closer to the user's eye-level, it still interferes with the user's leg movement and would require a bed with side rails, similar to those of a hospital bed, in order to use it at home.

3. Objects and Advantages

The object of this invention is to provide a pc tablet holder for bedtime reading that:

(a) allows the hands-free holding of a pc tablet above the user's mid-body area when the user is sitting on a horizontal surface with the back against a substantially normal surface in relation to the sitting surface;

(b) is supported by the sitting surface, not the user's lap, to minimize the restriction on the user's legs mobility;

(c) holds a pc tablet at the user's comfortable eye-level so the user need not to tilt the head down for viewing and interacting with the pc tablet's touch screen;

(d) allows the easy engagement and disengagement of the pc tablet into the pc tablet holder without damaging the pc tablet's surface finishing;
(e) allows the selective positioning of the pc tablet in a portrait or landscape orientation;
(f) allows the easy adjustment of the pc tablet's reading angle;
(g) is versatile, lightweight and highly portable;
(h) is made from readily available materials and requires no complex manufacturing processes so it can be made inexpensive for the user.

Still further objects and advantages will become apparent from a study of the following description and the accompanying drawings.

SUMMARY

The present invention overcomes the disadvantages and limitations of the prior art by providing a pc tablet comprising a resilient elongated member, a string with crimped loop ends connecting the ends of the resilient elongated member forming a substantially "U"-shaped frame that has two downwardly disposed side legs and a vertex, flag ring terminal type string anchors fixedly attach a string loop end to a frame leg, a stand made from an elongated member is movably attached, by means of a retainer, to the vertex of the "U"-shaped frame to form a tripod-like holder, a top wire hook has a horizontally disposed arm with two ends and two side arms having a first end portion defining a catch and extending from each distal end of the horizontal arm, a pair of vertically disposed arms have a top portion extending from a second end portion of the side arms and end in a curl through which the vertex of the "U"-shaped frame is inserted, a bottom end cap has in combination a front wall, a back wall, two side walls, and a floor defining a space for receiving the bottom perimeter edge of a pc tablet, a loop upwardly extending from the back wall of the end cap has a diameter through which the string is inserted. In operation, the user sitting on a bed with the back against the head board positions the tripod-like holder over the user's mid-body section with the tripod's side legs on the sitting surface to the side areas of the user and the tripod's rear leg on the sitting surface at the user's crotch area. The user inserts the bottom perimeter edge of the pc tablet into the end cap's receiving space, and pushes down on the pc tablet, while the frame legs are pulled together by the string, until the space between the top wire hook and bottom end cap can accept the length of the height of the pc tablet. The user then positions the pc tablet's top perimeter edge behind the catch of the top wire hook. The user releases the downward push on the pc tablet causing the frame legs to resiliently move apart from each other biasing the bottom end cap and pc tablet against the top wire hook, securing the pc tablet therein.

DRAWINGS—FIGURES

DRAWINGS—REFERENCE NUMERALS

Figure 1:
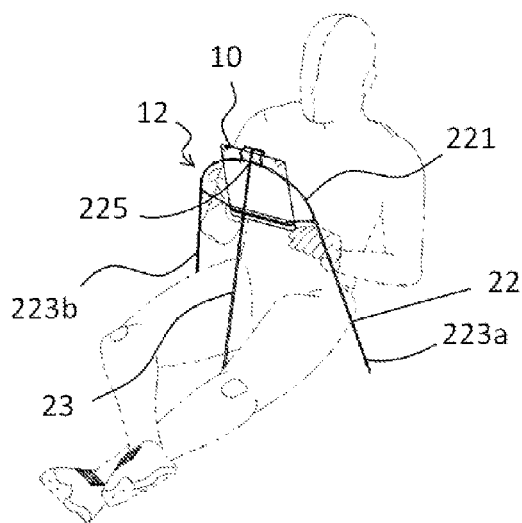
FIG. 1 is a perspective view of a pc tablet holder constructed in accordance with a preferred embodiment of the invention, showing a pc tablet being held by the pc tablet holder in portrait orientation and being used by a human.

10—pc tablet; 12—pc tablet holder; 20—wire hook; 201—front arm; 202—side arm; 203—catch surface; 204—vertical arm; 205—curl; 206—curl diameter; 21—end cap;

211—front wall; 212—back wall; 213—sidewall; 214—floor; 215—end cap vertical arm; 216—tubular arm; 217—tubular arm diameter; 218—end cap sewing thread; 219—endcap receiving space; 22—support frame; 221—elongated resilient member; 223a—left side leg; 223b—right side leg; 225—vertex; 23—stand; 231—stand top end; 24—retainer; 242—mid-section; 243—retainer arm; 244—retainer arm hole; 247—holder released state; 248—holder stretched state; 25—string; 253a—left loop end; 253b—right loop end; 254a—left crimp sleeve; 254b—right crimp sleeve; 255a—left string anchor; 255b—right string anchor; 256—anchor eye; 257—anchor tubular arm; 26—pocket assembly; 27—pocket holding panel; 271—pocket holding panel front side; 273—pocket holding panel tubular arm; 274—pocket holding panel tubular arm diameter; 275—pocket holding panel sewing thread; 28—top pocket; 281—top pocket front panel; 282—top pocket side panel; 283—top pocket floor panel; 284—top pocket receiving space; 285—top pocket extensions; 286—top bottom pockets sewing thread; 296—bottom pockets sewing thread; 29—bottom pocket; 291—bottom pocket front panel; 292—bottom pocket side panel; 293—bottom pocket floor panel; 294—bottom pocket receiving space; 295—bottom pocket extensions; 32—joining plate; 321—joining plate center hole; 322—joining plate front side; 324—first pair of diagonally opposed corners of joining plate; 325—second pair of diagonally opposed corners of joining plate; 33—clamping elements; 331—resilient arm; 332—contact surface; 333—rib; 34—base; 341—base center hole; 345—base tubular arm; 346—diameter of base tubular arm; 35—rivet; 36—stretchable connector; 361—stretchable connector front side; 362—stretchable connector back side; 364—top inner loop; 364a—diameter of top inner loop; 365—top outer loop; 365a—diameter of top outer loop; 366—loops sewing thread; 368—bottom inner loop; 368a—diameter of bottom inner loop; 369—bottom outer loop; 369a—diameter of bottom outer loop; 38—flat hook; 381—flat hook first arm; 385—slot; 386—flat hook second arm; 389—flat hook contact surface; 390—flat hook catch; 40—bottom wire hook; 401—bottom wire hook front arm; 402—bottom wire hook side arm; 403—bottom wire hook catch; 404—bottom wire hook vertical arm; 405—bottom wire hook curl; 406—bottom wire hook curl diameter.

Detailed Description—FIGS. 1 Through 4—Preferred Embodiment

As shown in the drawings for purposes of illustration, the present invention is concerned with a pc tablet holder, generally referred to by the reference number 12, which allows the hands-free holding of a pc tablet above the user's mid-body area and near the user's eye-level when the user is sitting on a horizontal surface with the back against a surface perpendicular to the sitting surface. This human body position occurs during bedtime reading, when the user is sitting on a reclining chair, or when the user is sitting on the floor with the back against a wall.

Figure 2:
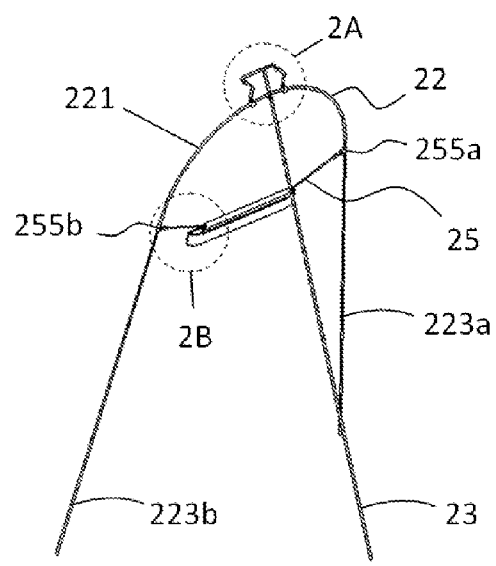
FIG. 2 is a perspective view of the pc tablet holder included in FIG. 1 without the pc tablet and viewed from another direction.
Figure 2A:
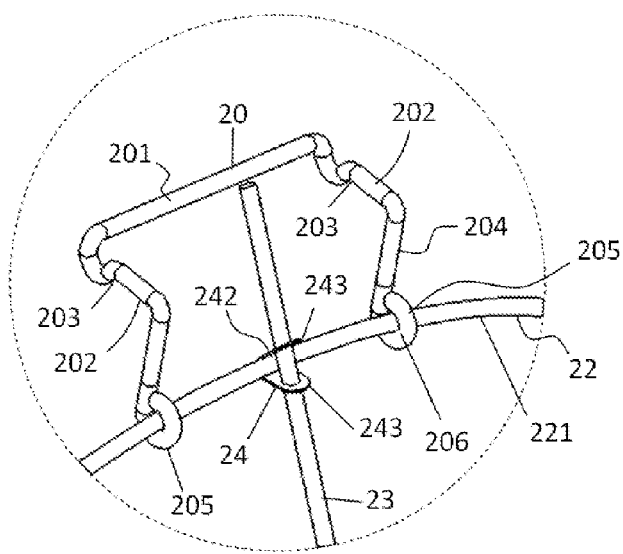
FIG. 2A is an enlarged perspective view of only a main part of FIG. 2.
Figure 2B:
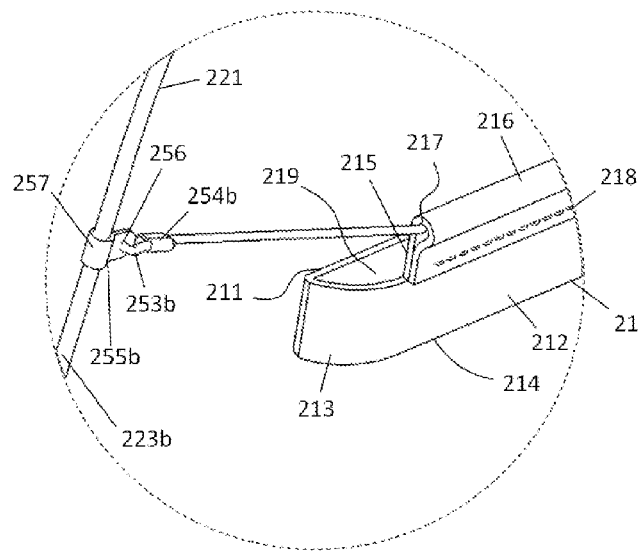
FIG. 2B is an enlarged perspective view of only a main part of FIG. 2.

With reference to FIG. 1 through FIG. 2b the pc tablet holder 12 comprises a support frame 22 made from an elongated resilient member 221 that keeps memory of its straight shape similar to a structural fiberglass rod. The elongated resilient member 221 has a pre-determined cross-sectional shape, a mid-point and two ends downwardly bent from the mid-point forming a "U"-shaped frame with a vertex 225 and two legs 223a and 223b. The length of the elongated resilient member 221 is such that the height of the support frame 22, measured from the end of legs 223a and 223b to the vertex 225 of the "U"-shaped frame, is approximately the distance between the sitting surface and the eye-level of an average human.

A string 25 for holding the frame legs 223a and 223b in "U"-shape is made from a flexible material including any of cotton fiber, synthetic fiber, braided steel rope, or leather and has loops 253a and 253b formed at the ends. Double barrel crimp sleeves 254a and 254b secure each loop 253a and 253b. String anchors 255a and 255b secure each loop 253a and 253b, respectively to the frame legs 223a and 223b. The string anchors 255a and 255b are of flag ring terminal type and have an eye 256 to receive the string loops 253a and 253b therethrough and a tubular arm 257 to receive the frame legs 223a and 223b therethrough. The string anchors 255a and 255b are fixedly mounted onto the frame legs 223a and 223b at a distance, downwardly measured from the frame vertex 225, no larger than the longitudinal length of a pc tablet in portrait orientation.

Referring now to FIG. 2A a top pc tablet clamping element which is a wire hook is made from a resilient material such as coated spring wire or molded plastic to protect the pc tablet's surface finish. Wire hook 20 has a front arm 201, two side arms 202 each having a first end portion defining a catch surface 203 and extending from one distal end of the wire hook's front arm 201 at least the length of the pc tablet's thickness. Two vertically disposed arms 204 downwardly extend from a corresponding side arm and end in a curl 205. The curl has an internal diameter 206 suited for receiving the cross-sectional shape of the elongated resilient member 221. Wire hook 20 is carried by support frame 22 by disposing a portion of vertex 225 through curls 205. Referring now to FIG. 2B a bottom pc tablet clamping element which is an end cap is made from a stretchable material such as textiles, synthetic fabric, leather, or molded from plastic or rubber to protect the pc tablet's surface finishing. End cap 21 has a front wall 211 extending the pc tablet's width length disposed in portrait orientation, a back wall 212 parallel to and spaced from the front wall 211 a distance of at least the length of the pc tablet's thickness. Two side walls 213 and a floor 214 connect the front and back walls 211 and 212. A vertically disposed arm 215 has a bottom end portion extending upwardly from the top of the back wall 212. The top end portion of vertically disposed arm 215 defines a tubular arm 216 that has a diameter 217 suited for receiving a portion of string 25 which joins frame legs 223a and 223b. Sewing thread 218 is used to secure the tubular arm 216. A receiving space 219 is defined between the front wall 211, back wall 212, side walls 213, and floor 214 of end cap 21 for receiving the bottom end of the pc tablet disposed in a portrait orientation. Front wall 211 has a height of approximately the height of the non-viewable bottom portion of the pc tablet's front screen.

Figure 3:
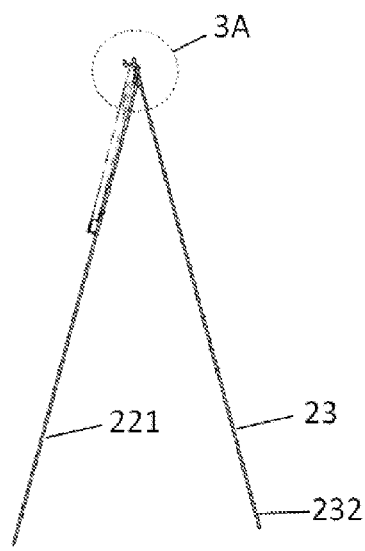
FIG. 3 is a right side view of the pc tablet holder in FIG. 1.
Figure 3A:
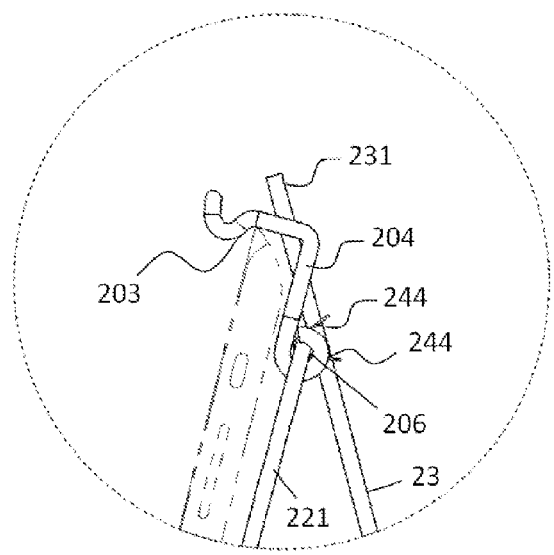
FIG. 3A is an enlarged right side view of only a main part of FIG. 3.

Referring now to FIG. 2A, FIG. 3 and FIG. 3A a stand 23, made from an elongated member with a predetermined cross-sectional shape, has a top end 231 removably attached to elongated resilient member 221 by means of retainer 24, forming a tripod-like structure. Retainer 24 is made from a resilient plate with mid-section 242 and two arms 243 obliquely bent from mid-section 242 forming a "V"-shaped structure. As shown in FIG. 3A each of the retainer arms has a hole 244 that is concentrically aligned to each other forming a bore through which the top end 231 of stand 23 is disposed. A user squeezes the retainer's arms 243 together to release the grip of the retainer 24 on the stand 23, allowing the stand 23 to be slidably adjusted for effectively changing the angle at which the pc tablet is held for reading.

Operation—Preferred Embodiment—FIGS. 1 through 2B and FIG. 4

Figure 4:
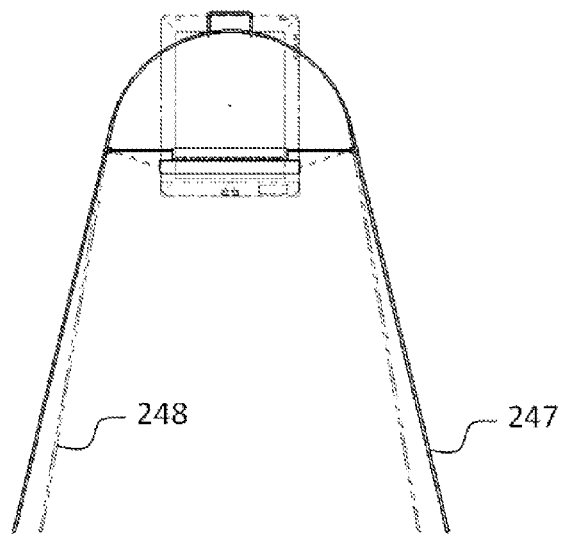
FIG. 4 is a front view of only the pc tablet holder included in FIG. 1 showing the released state (without pc tablet—solid line drawing) and the stretched state (with pc tablet—phantom line drawing) of the holder.

Referring now to FIG. 1 through FIG. 2B, and FIG. 4, the suspension and holding of the pc tablet above the user's mid-body area and near the user's eye-level is shown in FIG. 1. The support frame 22 and stand 23 are placed over the users mid-body area in a way that the left frame leg 223a rests on the sitting surface, at the left side of the user, the right frame leg 223b rests on the sitting surface at the right of the user and the stand 23 rests on the sitting surface at the user's crotch area. At this point the support frame 22 is in a released state 247, as shown in FIG. 4, as it has no pc tablet installed onto it. The user positions the bottom end of a portrait oriented pc tablet inside the end cap's receiving space 219 and while holding wire hook 20 in up-straight position the user pushes down on the pc tablet which causes the frame legs 223a and 223b to be pulled towards each other by string 25. Once the space between wire hook 20 and end cap 21 can accept the longitudinal length of the pc tablet, the user places the top perimeter edge of the pc tablet behind the catch 203 on wire hook 20. The downward push on the pc tablet is released which causes the frame legs 223a and 223b to resiliently separate from each other bringing end cap 21 and pc tablet 10 against wire hook 20 achieving the stretched state 248 of the pc tablet holder 12 and the hands-free holding of the pc tablet in portrait orientation. The user can adjust the support frame's angle for a better view of the pc tablet's screen by squeezing the retainer's arms 243 and sliding the stand 23 up to have a less steep reading angle or down for a steeper reading angle.

Figure 5:
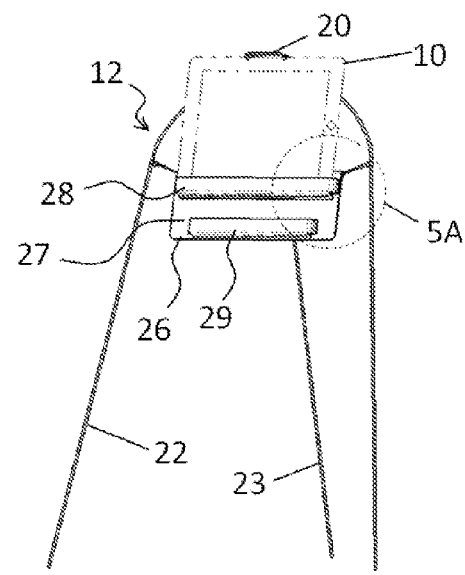
FIG. 5 is a perspective view of an alternative embodiment of the pc tablet holder where the bottom clamping element is a pocket assembly and the pc tablet is installed in landscape orientation.
Figure 5A:
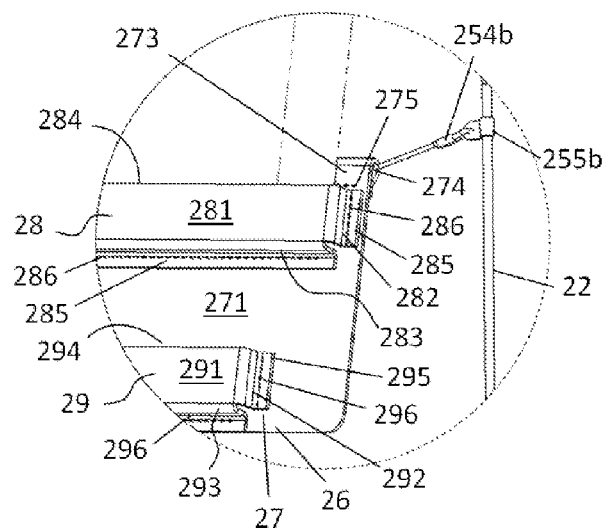
FIG. 5A is an enlarged perspective view of only a main part of FIG. 5.
Figure 6:
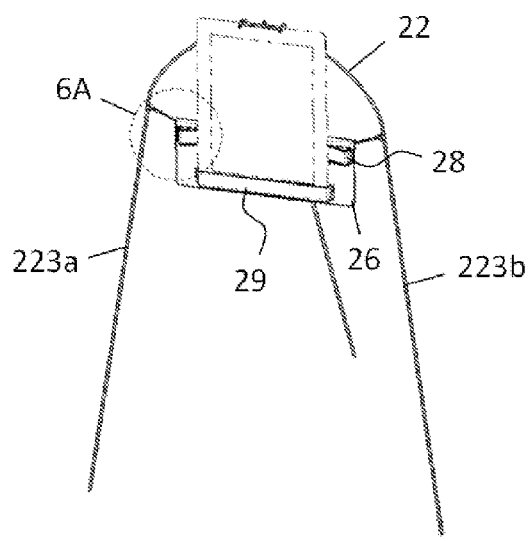
FIG. 6 is a perspective view of the pc tablet holder in FIG. 5 showing a pc tablet installed in portrait orientation.
Figure 6A:
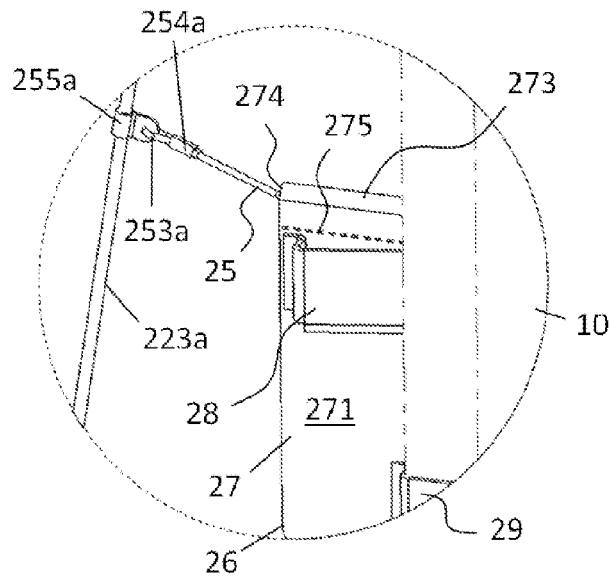
FIG. 6A is an enlarged perspective view of only a main part of FIG. 6 showing how the top pocket is pinned between the pc tablet and pocket holding panel when the pc tablet is installed at the bottom pocket for portrait orientation.

Description—First Alternative Embodiment—FIGS. 5 through 6A

In an alternative embodiment of the present invention in FIG. 5 the bottom clamping element of the pc tablet holder 12 of FIG. 2 is a pocket assembly 26 which allows installing the pc tablet 10 onto the holder in a portrait or a landscape orientation. Referring to FIG. 5 through FIG. 6A pocket assembly 26 has a pocket holding panel 27 with a front side 271 and a tubular arm 273, along the width of a top end portion of holding panel 27, secured by sewing thread 275. Tubular arm 273 has a diameter 274 suited for receiving a portion of string 25. Top and bottom pockets 28 and 29 are fixedly mounted on pocket holding panel 27 using sewing thread 286 and 296, respectively. The width of top pocket 28 is suited to receive the bottom end of a pc tablet in landscape orientation and the width of bottom pocket 29 is suited to receive the bottom end of a pc tablet in portrait orientation. The pockets are made of a flexible and stretchable material such as textiles, synthetic fabric, leather, or molded from rubber to protect the pc tablet's surface finishing and to allow the pinning of top pocket 28 between the pc tablet and the pocket holding panel 27 when the pc tablet is mounted in the bottom pocket, as shown in FIG. 6A. The string anchors 255a and 255b are fixedly mounted onto frame legs 223a and 223b at a distance, downwardly measured from the top of frame 22, no larger than the length of the width of a pc tablet in portrait orientation.

Operation—First Alternative Embodiment—FIGS. 5 through 6A

For holding a pc tablet in landscape orientation the user places the bottom end of a pc tablet disposed in landscape orientation inside the receiving space 284 of top pocket 28, and for holding a pc tablet in portrait orientation the user places the bottom end of the pc tablet disposed in portrait orientation inside the receiving space 294 of bottom pocket 29. The user proceeds to push down on the pc tablet, while the support frame's right and left legs are pulled towards each other by string 25, until the top perimeter edge of the pc tablet is below the catch surface of wire hook 20. The user accommodates the top perimeter edge of the pc tablet behind catch surface 203 of wire hook 20 and proceeds to release the downward push force on the pc tablet. Releasing the downward push on the pc tablet causes the support frame's side legs 223a and 223b to resiliently separate from each other biasing the pocket assembly 26 and pc tablet towards wire hook 20 securing the pc tablet therebetween, thereby achieving a hands-free holding of the pc tablet.

Description—Second Alternative Embodiment—FIGS. 7 through 11

Figure 7:
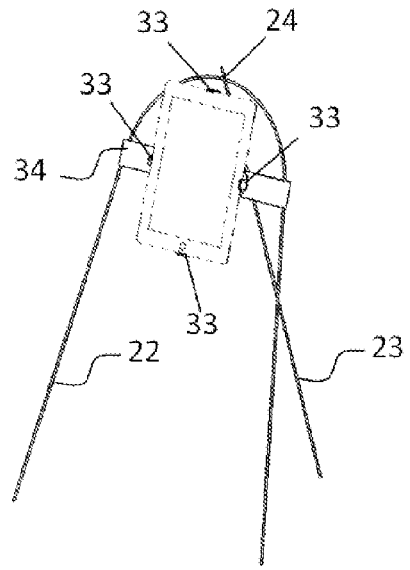
FIG. 7 is a perspective view of an alternative embodiment of the pc tablet holder that provides the capability to rotate the pc tablet from portrait to landscape orientation and vice versa without removing the pc tablet from the clamping elements.
Figure 8:
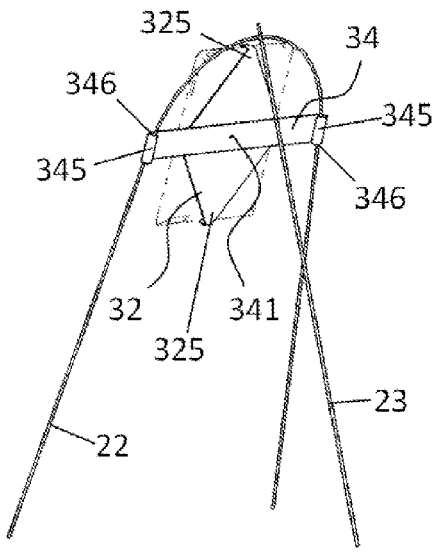
FIG. 8 is a perspective view of the pc tablet holder included in FIG. 7 viewed from the back.

In an alternative embodiment of the present invention in FIG. 7 the clamping elements of the pc tablet holder 12 of FIG. 2 are joined by a joining plate which is rotatably mounted onto a base by means of a rivet to provide rotation capability of the pc tablet without having to remove the pc tablet from the clamping elements. Referring now to FIG. 7 through FIG. 11 the joining plate 32 can be made from rigid metal sheet with polished surfaces, to protect the pc tablet's surface finish, and has the shape of a parallelogram. Pair of opposing clamping elements 33 are formed, through a metal stamping process, at the diagonally opposed corners 324 and 325 of joining plate 32. Each clamping element has a resilient arm 331 that extends normally, the length of the thickness of the pc tablet, from the front side 322 of joining plate 32 and ends in a contact surface 332 defining a rib 333 for catching a portion of the perimeter edge of the pc tablet. The ribs on the pair of diagonally opposed clamping elements are facing each other. The base 34 has a rectangular shape and is also made from rigid metal sheet. A tubular arm 345 extends from each distal end of the base and has an internal diameter 346 suited to receive the legs of frame 22. The tubular arms 345 are separated from each other a distance suited to keep the frame's legs apart from each other a distance suitable to accept the mid-body section of an average human disposed transversally between the frame's legs 223a and 223b.

A rivet 35 is installed through the bore created by the concentric alignment of a hole 321 near the mass center of joining plate 32 and a hole 341 near the mass center of base 34. Other types of fasteners that allow the rotation of the joined parts around the fastener like screw and nuts, ball and socket or the like can also be used to join base 34 and joining plate 32.

Operation—Second Alternative Embodiment—FIGS. 7 through 11

Figure 9:
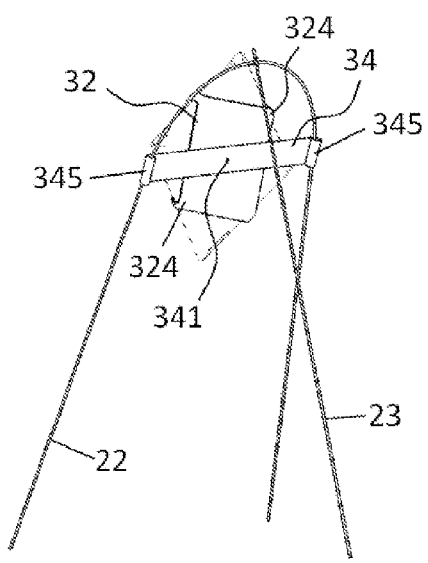
FIG. 9 is a perspective view of the pc tablet holder included in FIG. 8 showing a state in the process of changing the pc tablet orientation from portrait to landscape.
Figure 10:
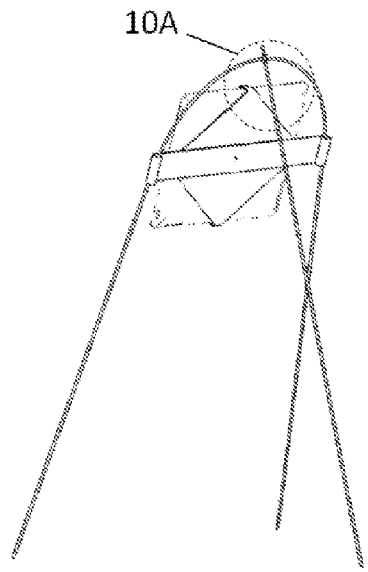
FIG. 10 is a perspective view of the pc tablet holder included in FIG. 8 showing a state after the pc tablet orientation has been changed to landscape.
Figure 10A:
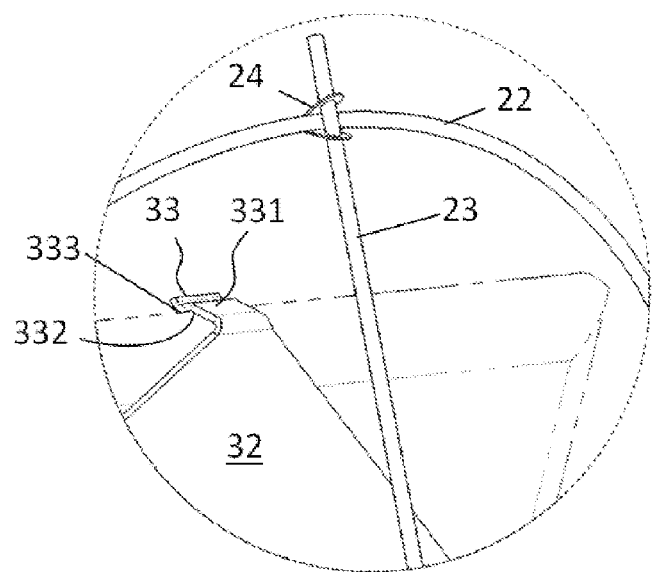
FIG. 10A is an enlarged perspective view of only a main part of FIG. 10.
Figure 11:
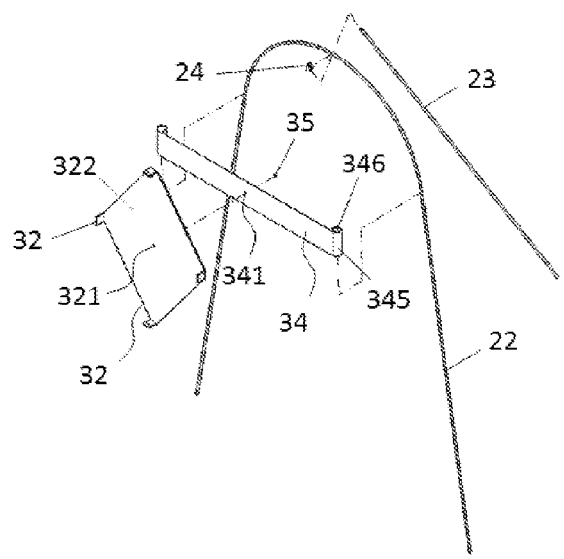
FIG. 11 is an exploded view of the pc tablet holder included in FIG. 7 without the pc tablet.

A user places a portion of the bottom perimeter edge of a pc tablet on the contact surface behind the rib 333 of the resilient arm 331 of the bottom-most clamping element on joining plate 32, then aligns the side portions of the perimeter edge of the pc tablet between the left and right clamping elements on joining plate 32. The user then proceeds to push the top perimeter edge of the pc tablet against the rib 333 of the resilient arm 331 of the top-most clamping element 33 on joining plate 32, until the side and top perimeter edges of the pc tablet snap behind each of the corresponding one of the ribs 333 and become in contact with the corresponding one of the contact surfaces 332 of each of the corresponding one of clamping elements 33. The user can now rotate the clamped pc tablet from a portrait to a landscape orientation and vice versa as shown in FIG. 9 and FIG. 10.

Description—Third Alternative Embodiment—FIGS. 12 through 16

Figure 12:
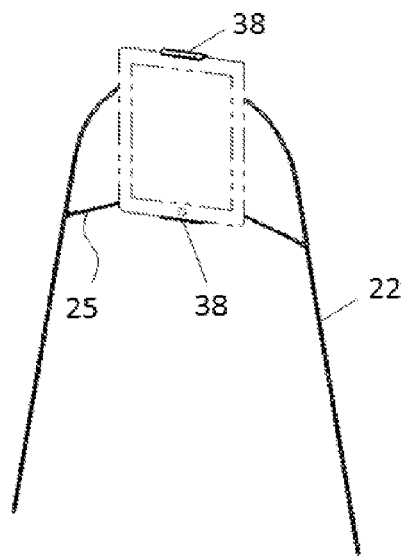
FIG. 12 is a perspective view of an alternative embodiment of the pc tablet holder that increases portability by eliminating the stand and retainer parts.
Figure 13:
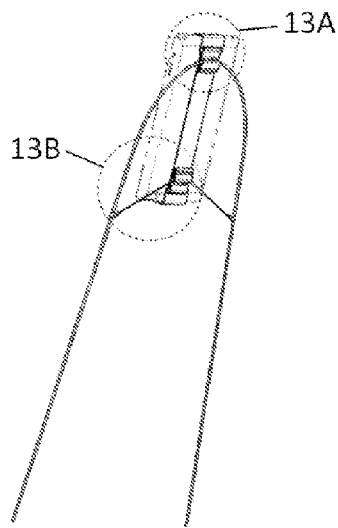
FIG. 13 is a perspective view of the pc tablet holder included in FIG. 12 viewed from the back.
Figure 13A:
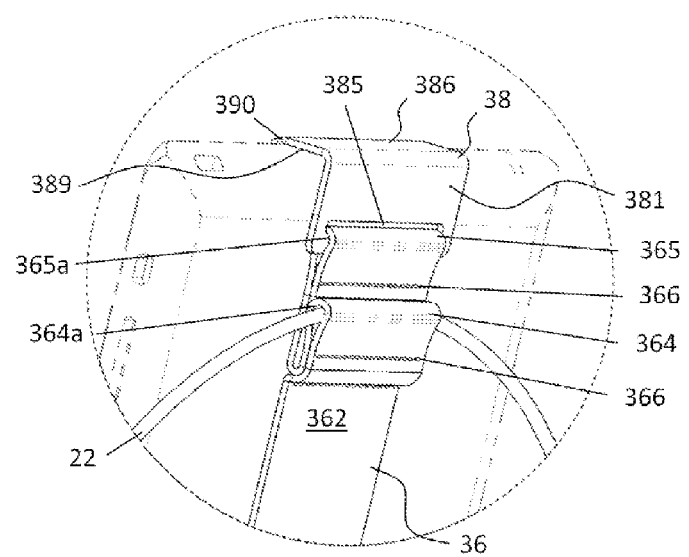
FIG. 13A is an enlarged perspective view of only a main part of FIG. 13.
Figure 13B:
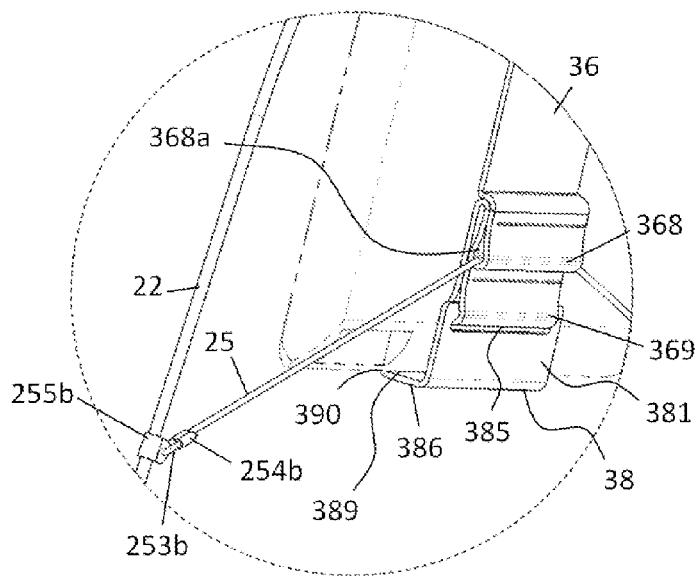
FIG. 13B is an enlarged perspective view of only a main part of FIG. 13.
Figure 14:
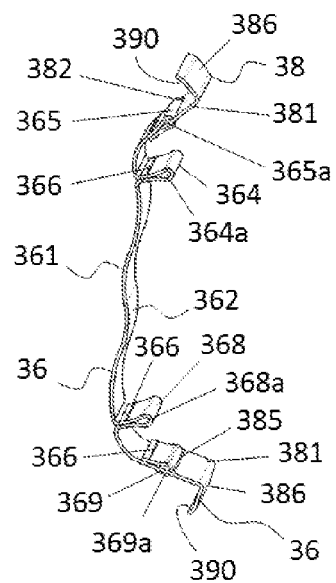
FIG. 14 is a perspective view of only a main part of the pc tablet holder included in FIG. 12.

In the alternative embodiment of the present invention in FIG. 12 the top and bottom clamping elements of the pc tablet holder 12 of FIG. 2 are flat hooks 38 joined in opposed fashion by a stretchable connector which carries the clamping elements and connects them to frame 22. This version of the pc tablet holder is one that is used without the stand 23 (shown in FIG. 2) for increased portability. Referring now to FIGS. 12 through 16 flat hooks 38 can be made from metal sheet by a metal stamping process and have polished surfaces to protect the pc tablet's surface finish. Each of the flat hooks 38 has a first vertically disposed arm 381 with top and bottom end portions, a second arm 386 extending normally from the top end portion of the first arm 381 ending in a catch surface 390 for catching a portion of the pc tablet's perimeter edge. A mounting slot 385 is defined at the second end portion of the first arm 381 for mounting the flat hooks 38 onto the outer loops 365 and 369. The stretchable connector 36 is made from a flexible stretchable material to protect the pc tablet's surface finish and in this embodiment is made from fabric elastic band. Two inner 364 and 368 and two outer 365 and 369 transversal loops are sawn on the back side 362 of the distal end portions of stretchable connector 36 using sewing thread 366. Flat hooks 38 are mounted onto the outer transversal loops 365 and 369 of stretchable connector 36 in opposed fashion. The vertex of the support frame 22 is introduced through the top inner transversal loop 364 and the string 25 is introduced through the bottom inner transversal loop 368 keeping the section of stretchable connector 36 between the inner loops 364 and 368 at a constant stretched state. The stretchable connector sections between the top outer loop 365 and the top inner loop 364 and between the bottom outer loop 369 and bottom inner loop 368 are in an un-stretched state until a pc tablet is clamped between the top and bottom flat hooks. The length of the separation of the contact surfaces 389 between the top and bottom flat hooks in un-stretched state is shorter than the length of the width of the pc tablet in portrait orientation to allow the mounting of the pc tablet between the top and bottom flat hooks in either portrait or landscape orientation.

Operation—Third Alternative Embodiment—FIGS. 12 through 16

Figure 15:
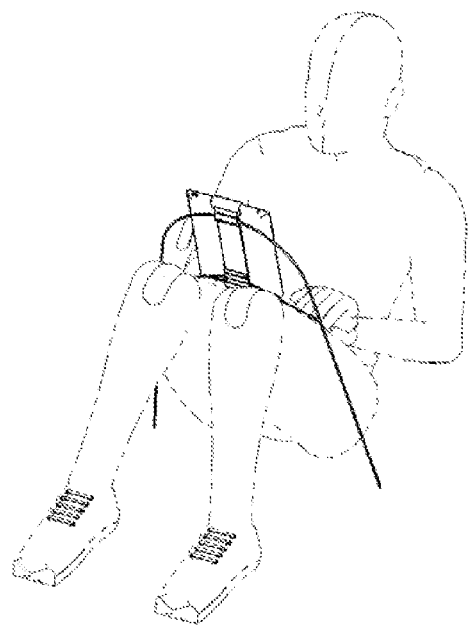
FIG. 15 is a perspective view of the pc tablet holder in FIG. 12 being supported in a reading angle by the user's drawn up knees.

As shown in FIG. 15 the suspension and holding of the pc tablet above the user's mid-body area is achieved by positioning the support frame 22 over the user's mid-body area against the drawn up knees of the user in a way that the left and right legs of the frame 22 rest on the sitting surface at the left and right sides, respectively, of the user. The user places the bottom perimeter edge of the pc tablet on the contact surface 389 behind catch 390 of the bottom flat hook, then pushes down on the pc tablet, while stretchable connector member 36 stretches, until the space between the top and bottom flat hooks is enough as to accept the length of the height of the pc tablet in either landscape or portrait orientation. The user proceeds to accommodate the top perimeter edge of the pc tablet onto the contact surface 389 behind catch 390 of the top flat hook, then releases the downward push force on the pc tablet, allowing stretchable connector member 36 to contract securing the pc tablet between the top and bottom flat hooks, achieving the hands-free holding of the pc tablet.

Figure 16:
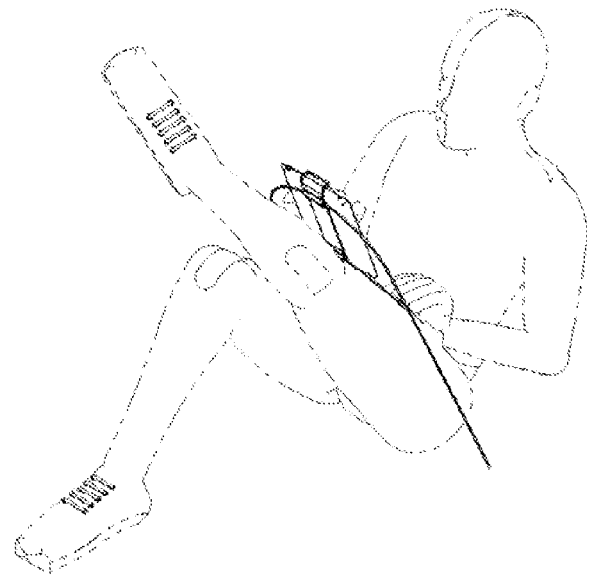
FIG. 16 is a perspective view of the pc tablet holder in FIG. 12 being supported in a reading angle by the user's leg crossed over a drawn up knee.

In this configuration the user adjusts the reading angle of the pc tablet by changing the angle of the frame legs 223*a* and 223*b*, in relation to the sitting surface, while keeping the back of the suspended pc tablet against the drawn up knees. By omitting the use of the stand 23 (shown in FIG. 2) the user can cross one leg over a drawn up knee as shown in FIG. 16 and has less holder parts to carry or store increasing portability of the pc tablet holder.

Figure 17:
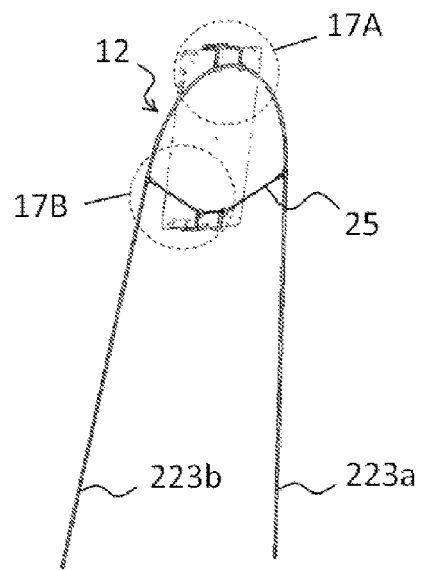
FIG. 17 is a perspective view of an alternative embodiment of the pc tablet holder where the top and bottom clamping elements are wire hooks, viewed from the back.
Figure 17A:
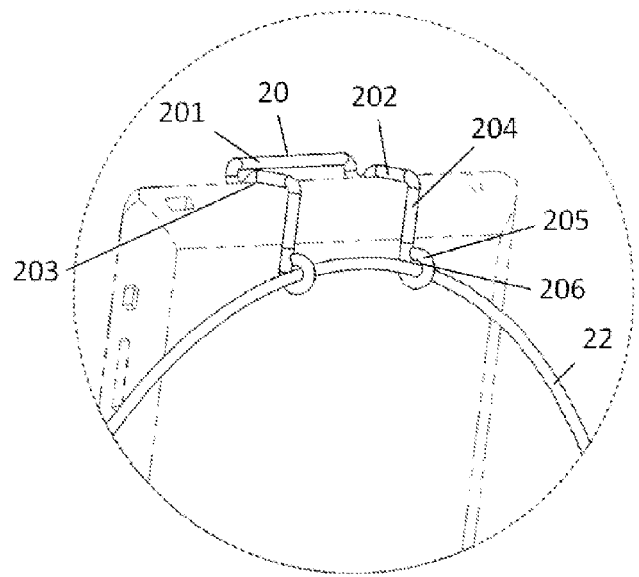
FIG. 17A is an enlarged perspective view of only a main part of FIG. 17.
Figure 18:
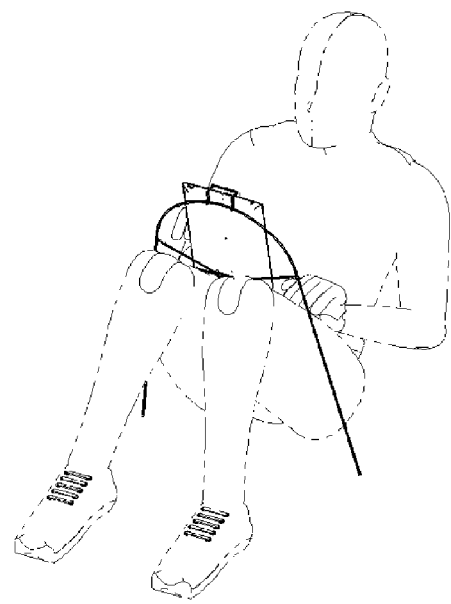
FIG. 18 is a perspective view of the pc tablet holder in FIG. 17 being supported in a reading angle by the user's drawn up knees.

Description—Fourth Alternative Embodiment—FIGS. 17 through 18

Figure 17B:
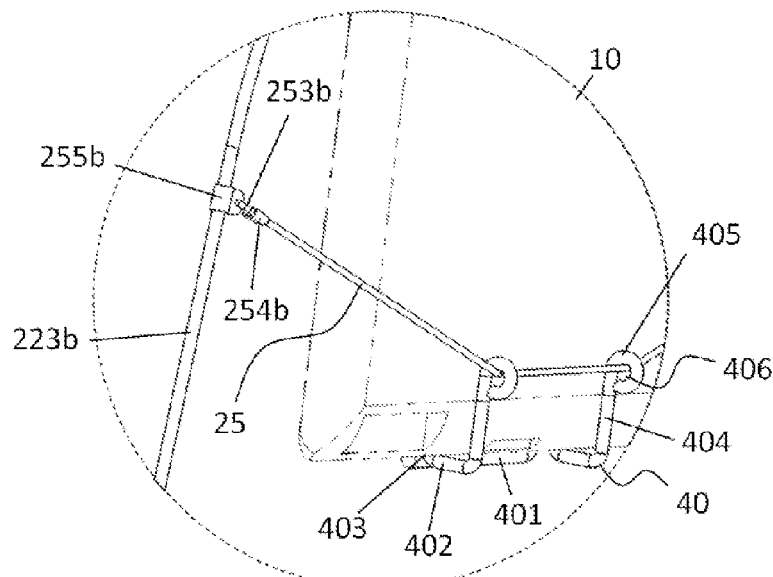
FIG. 17B is an enlarged perspective view of only a main part of FIG. 17.

In an alternative embodiment of the present invention in FIG. 17 the bottom clamping element of the pc tablet holder 12 of FIG. 2 is also a wire hook and is carried by the string 25. Referring now to FIG. 17 through FIG. 17B the top wire hook 20 is carried by a vertex portion of frame 22 and the bottom wire hook 40 is carried by string 25 in opposed fashion to the top wire hook 20. The bottom wire hook 40 is of the same construction and shape as the top wire hook 20 to protect the pc tablet's surface finish. The wire hook 40 has a front arm 401, two side arms 402 each having a first end portion defining a catch surface 403 and extending from one distal end of the wire hook's front arm 401 at least the length of the pc tablet's thickness. Two vertically disposed arms 404 upwardly extend from a corresponding side arm and end in a curl 405. The curl has an internal diameter 406 suited for receiving the cross-sectional shape of the string 25. The wire hook 40 is carried by the string 25 by disposing a portion of string 25 through curls 405.

Operation—Fourth Alternative Embodiment—FIGS. 17 through 18

As shown in FIG. 18 the suspension and holding of the pc tablet above the user's mid-body area is achieved by positioning the support frame 22 over the user's mid-body area against the drawn up knees of the user in a way that the left and right legs of the frame 22 rest on the sitting surface at the left and right sides, respectively, of the user. To achieve the hands-free holding of the pc tablet the user positions the bottom perimeter edge of the pc tablet behind the catch 403 of bottom wire hook 40 and, while holding the top wire hook 20 in up-straight position, pushes down on the pc tablet which causes the frame legs 223*a* and 223*b* to be pulled towards each other by string 25. Once the space between the top and bottom wire hooks 20 and 40 can accept the length of the height of the pc tablet, the top perimeter edge of the pc tablet is placed behind the catch 203 on top wire hook 20. The downward push on the pc tablet is released which causes the frame legs 223*a* and 223*b* to resiliently separate from each other bringing the bottom wire hook 40 and pc tablet 10 towards the top wire hook 20 achieving the hands-free holding of the pc tablet in portrait orientation. In this configuration the user adjusts the reading angle of the pc tablet by changing the angle of the frame legs 223*a* and 223*b*, in relation to the sitting surface, while keeping the back of the suspended pc tablet against the drawn up knees.

It should be understood that the invention is not limited to the exact embodiments and construction which have been illustrated and described but that various changes may be made without departing from the spirit and the scope of the invention.

What is claimed is:

1. A pc tablet holder for suspending a pc tablet over the user's mid-body area for bedtime reading comprising:

pc tablet clamping means having at least a first and second clamping elements disposed in opposed fashion and made from pc tablet touch screen surface non-scratching materials for removably securing a pc tablet therein in any angle within a portrait and landscape pc tablet orientation, without blocking any pc tablet's screen display area and without interfering with the pc tablet's touch screen operation, a support frame having at least a right and a left side leg, a vertex, and an open space between said legs and vertex large enough as to receive therein a user's mid-body cross-sectional area and said pc tablet clamping means above the user when the user is sitting on a surface with the back against another surface substantially normal to said sitting surface, and connecting means for connecting the pc tablet clamping means to said support frame and for maintaining said leg's relative position, whereby said user (a) transversally places the open space of said support frame over the user's mid-body area in a way that the legs of said support frame abuts the sitting surface adjacent to the user's surrounding areas, (b) clamps the pc tablet onto said clamping means achieving a hands-free holding of said pc tablet at a substantial user's eye-level height.

2. The pc tablet holder of claim 1 wherein said support frame comprises a single flexible and resilient elongated member having a mid-point, a pre-determined cross-sectional shape and two ends downwardly bent below said mid-point forming a substantially inverted "U"-shaped frame with said vertex, said right and left side legs, said open space between said legs, and a stand, said stand comprising an elongated resilient member having top and bottom ends, said top end being removably, pivotally, and slidably attached to said vertex of said inverted "U"-shaped frame by means of a resilient retainer, forming a tripod-like structure with two side legs and a pivoting and slidable center leg for adjusting said frame's angle.

3. The pc tablet holder of claim 2 wherein said retainer comprises a resilient plate having a mid-section, two arms extending from said mid-section forming a substantially "V" shaped structure, each of said arms having a hole, said holes being concentrically aligned defining a bore for slidably receiving the top end of said stand, said retainer arms having a squeezed state for allowing the sliding of said stand along said bore and a released state for restricting the sliding of said stand along said bore.

4. The pc tablet holder of claim 3 wherein said connecting means comprises a string having a mid-point, two ends each forming a loop therein, a crimp sleeve holding each string loop, an anchor for anchoring each of the string loops to a corresponding one of each of the support frame's side legs, said anchor being selected from the group consisting of flag ring terminals, double barrel crimp sleeves, cable-ties.

5. The pc tablet holder of claim 4 wherein said pc tablet touch screen surface non-scratching materials are selected from the group consisting of molded plastics, plastic coated wire, natural and synthetic textiles, leather, rubbers, mirror polished metal sheet, mirror polished wire stock or a combination thereof, at least one of said first clamping element is carried by said support frame, said second clamping element being carried by said string in an opposed fashion relative to said first clamping element, said clamping elements being selected from the group consisting of wire hooks, flat hooks, end caps, pockets or a combination thereof.

6. The pc tablet holder of claim 5 wherein said first clamping element is a wire hook, said wire hook comprising:

a front arm horizontally disposed and having two end portions, first and second side arms each having a first end portion defining a catch surface and normally extending from a corresponding one distal end of said front arm at least the length of the pc tablet's thickness, and first and second vertical arms each having a top end portion normally extending from a second end portion of said side arms and having a bottom end portion defining a curl of pre-determined diameter for receiving the cross-section of said support frame.

7. The pc tablet holder of claim 6 wherein said bottom second clamping element is an end cap, said end cap comprising:

a horizontally disposed front wall extending the pc tablet's width length and having top and bottom end portions, a back wall parallel to said front wall having top and bottom end portions and spaced from said front wall a distance of at least the length of the pc tablet's thickness, two side walls having top and bottom end portions and a first end portion extending from one distal end of said front wall to a corresponding distal end of said back wall, one floor having left and right end portions and a first end portion extending normally from said bottom end portion of said front wall to said bottom end portion of said back wall, said left and right end portions extending to a corresponding said bottom end portion of said side walls, a vertically disposed arm having a bottom end portion extending upwardly from said top end portion of said back wall, and a top end portion defining a tubular arm, said tubular arm having a diameter for receiving a portion of said string therethrough, and a receiving space defined between the front wall, back wall, side walls, and floor, for receiving the bottom end of the pc tablet disposed in a portrait configuration, whereby a user (a) places the bottom end of said pc tablet inside said receiving space (b) pushes down on the pc tablet, while the support frame's right and left legs are pulled towards each other by said string, until the space between the wire hook and end cap is enough as to accept the longitudinal length of a portrait oriented pc tablet, (c) accommodates the top end of said pc tablet behind the catch surface of said wire hook, (d) releases the downward push force on the pc tablet, while the support frame's right and left legs resiliently separate from each other biasing said end cap towards said wire hook and securing the pc tablet therebetween, thereby achieving a hands-free holding of the pc tablet.

8. The pc tablet holder of claim 6 wherein said bottom second clamping element is a pocket assembly, said pocket assembly comprising:

a pocket holding panel having a front side, a back side, top end and bottom end portions, said top end portion defining a tubular arm, said tubular arm having a diameter for receiving a portion of said connecting means therethrough, and sewing thread securing said tubular arm, top and bottom pockets fixedly mounted on said front side of said pocket holding panel and each comprising:

a front panel disposed in parallel relation to said pocket holding panel and having top and bottom end portions, two side panels each having a first end portion extending from one distal end of said front panel to said pocket holding panel, a floor panel having a first end portion extending from said bottom end portion of said front panel to said pocket holding panel, a receiving space defined between said front panel, said two side panels and said floor panel, two extensions each extending from a second end portion of a corresponding one of said two side panels, each abutting on said front side of said pocket holding panel, one extension extending from a second end portion of said floor panel abutting on said front side of said pocket holding panel, and sewing thread securing said extensions to said pocket holding panel.

9. The pc tablet holder of claim 8 wherein said receiving space of said top pocket is suited to receive the longitudinal length of the pc tablet for landscape oriented mounting of said pc tablet; said receiving space of said bottom pocket is suited to receive the length of the width of said pc tablet for portrait oriented mounting of said pc tablet, said top pocket being made of a flexible material that can be pinned between said pc tablet and said pocket holding panel for portrait oriented mounting of said pc tablet, said flexible material being selected from the group consisting of cotton fabrics, synthetic fabrics, leather, elastics, rubber, or a combination thereof, whereby a user (a) selectively places the bottom end of said pc tablet disposed in landscape orientation inside said receiving space of said top pocket or places the bottom end of said pc tablet disposed in portrait orientation inside said receiving space of said bottom pocket, (b) pushes down on the pc tablet, while the support frame's right and left legs are pulled towards each other by said connecting means, until the top perimeter edge of said pc tablet is below said catch surface, (c) accommodates the top end of said pc tablet behind said catch surface, (d) releases the downward push force on the pc tablet, while the support frame's side legs resiliently separate from each other biasing said pocket assembly and the pc tablet towards said wire hook securing the pc tablet therebetween, thereby achieving a hands-free holding of the pc tablet.

10. The pc tablet holder of claim 3 wherein said pc tablet clamping means comprise a plurality of clamping elements joined by a joining plate made from polished metal sheet, said joining plate having a substantially parallelogram-shape, a hole adjacent to its mass center for receiving a rotatable fastener therethrough, a front side, a back side, a pair of diagonally opposed corners extending the length of the width of said pc tablet, a pair of diagonally opposed corners extending the longitudinal length of said pc tablet.

11. The pc tablet holder of claim 10 wherein each of said clamping elements include a resilient arm having a first end portion protruding normally to said front side at said corners of said joining plate and extending at least the length of the thickness of the pc tablet, said resilient arm ending in a contact surface, said contact surface having a rib for catching a portion of the perimeter edge of said pc tablet, said ribs facing each other in the pair of resilient arms in the diagonally opposed corners.

12. The pc tablet holder of claim 11 wherein said connecting means comprises a base and a rotatable fastener, said base having a hole adjacent to its mass center for receiving said rotatable fastener therethrough, a front and a back side, at least two end portions, a transversally disposed tubular arm having a first end portion tangentially extending from each of said end portions of said base, said tubular arms having an internal diameter suited for receiving the cross-section of the support frame's side legs, said rotatable fastener being selected from the group consisting of rivets, screws and nuts, ball and socket, whereby a user (a) places a portion of the bottom perimeter edge of said pc tablet on the contact surface behind the rib of the resilient arm of the bottom-most clamping element on said joining plate (b) aligns the side portions of the perimeter edge of said pc tablet between the adjacent clamping elements on said joining plate (c) pushes the top perimeter edge of said pc tablet against the rib of the resilient arm of the top-most clamping element on said joining plate, until the side and top perimeter edges of the pc tablet snap behind each of the corresponding one of the ribs and in contact with the corresponding one of the contact surfaces (d) positions the pc tablet in portrait or landscape orientation by rotating said joining plate.

13. The pc tablet holder of claim 5 wherein said stand and said retainer are omitted and said first and second clamping elements are connected by an stretchable connector member in opposed fashion, said stretchable connector member having front and back sides and top and bottom end portions, said top and bottom end portions each defining an inner and an outer transversally disposed loops, said loops protruding from said back side and secured with sewing thread therein, said stretchable connector member being made of a stretchable material selected from the group consisting of cotton fabrics, synthetic fabrics, leather, elastics, rubber, or a combination thereof.

14. The pc tablet holder of claim 13 wherein said clamping element is a flat hook made from mirror polished sheet metal comprising:

a first arm vertically disposed and having front and back sides, top and bottom end portions, said bottom portion defining a horizontally disposed slot for receiving the outer loops, a second arm having a first end portion extending normal to said front side from said top end portion of said first arm at least the length of the pc tablet's thickness, a second end portion having a contact surface, said contact surface having a catch for catching a portion of the pc tablet's perimeter edge.

15. The pc tablet holder of claim 14 wherein the inner transversal loop on the top end of said stretchable connector member is carried by the vertex of said support frame, the inner transversal loop on the bottom end portion of said stretchable connector member is carried by a portion of said string, the outer transversal loop on said top portion of said stretchable connector member holds the first of said flat hooks, and said outer transversal loop on said bottom end portion of said stretchable connector member holds the second of said hooks in opposed fashion relative to the first flat hook, whereby a user (a) places a portion of the bottom perimeter edge of said pc tablet on the contact surface behind the catch of the second flat hook, (b) pushes down on the pc tablet, while stretchable connector member stretches until the space between the first and second flat hooks is enough as to accept the longitudinal length of a portrait oriented pc tablet, (c) accommodates a portion of the top perimeter edge of said pc tablet onto the contact surface behind the catch of the first flat hook, (d) releases the downward push force on the pc tablet, while the stretchable connector member contracts biasing the second of said flat hooks towards the first of said flat hooks securing the pc tablet therebetween, thereby achieving a hands-free holding of the pc tablet.

16. A pc tablet holder for providing a hands-free holding of a pc tablet for bedtime reading, comprising:
- a frame having at least two legs and comprising a first and second elongated resilient members of predetermined length and cross-sectional shape, each having a midpoint and two ends,
- a string having crimped loop ends for connecting said ends of said first elongated resilient member in a relative position to each other so as to form a substantially "U"-shaped structure,
- string anchors for fixedly attaching a corresponding one of each of the string loop ends to a corresponding one of each of said ends of said first elongated resilient member, said anchors being selected from the group consisting of flag ring terminals and double barrel crimp sleeves,
- a retainer for movably connecting one end of said second elongated resilient member to the vertex of the "U"-shaped structure to form a tripod-like holder,
- a top clamping element having a horizontally disposed arm with two ends, two side arms with a first end portion defining a catch and extending from a distal end of said horizontally disposed arm the length of the pc tablet's thickness, a pair of vertically disposed arms having a top portion extending from a second end portion of said side arms and a bottom end portion defining a curl for receiving the cross-section of said first elongated resilient member, and
- a bottom clamping element having in combination a front wall, a back wall, two side walls, and a floor defining a space for receiving a pc tablet end, and having a tubular arm upwardly extending from a top end portion of said back wall, said tubular arm having a diameter suited for receiving said string therethrough,
- whereby a user sitting on a surface with the head and back against a wall substantially normal to the sitting surface (a) places said tripod-like holder over the user's body mid-section area with the right and left side legs of the tripod abutting the sitting surface adjacent to the user's right side and left side respectively, and the center leg of the tripod abutting the sitting surface adjacent to the user's crotch area (b) accommodates the bottom end of a pc tablet inside said receiving space (c) pushes the pc tablet down to increase the space between said top and bottom clamping elements while the side legs of the tripod are resiliently pulled towards each other by said string (d) accommodates the upper end of the pc tablet behind the catch of said top clamping element (e) releases the downward push on the pc tablet while the side legs of the tripod resiliently move away from each other biasing said bottom clamping element and pc tablet against said top clamping element, securing the pc tablet therebetween in a portrait orientation and providing a hands-free holding of the pc tablet near the user's eye-level.

17. A method for a user to use a pc tablet holder for suspending and holding a pc tablet above the user's mid-body area when the user is laying on a bed with the back against the headboard, said pc tablet holder comprising at least a top and bottom clamping elements for removably catching said pc tablet therebetween, said clamping elements being resiliently connected to each other in opposed fashion, a frame having at least a right and a left leg, and a connector for connecting at least one of said clamping elements to said frame, said method comprising the steps of:
- (a) providing said pc tablet holder,
- (b) transversally placing said frame over the user's mid-body area in a way that the right side leg of said frame abuts the sitting surface adjacent to the right side of the user's mid-body area and the left leg of said frame abuts the sitting surface adjacent to the left side of the user's mid-body area,
- (c) rising the knees at least to chest level and resting said frame against the thighs in an angle approximately between 45 and 90 degrees in relation to the sitting surface,
- (d) catching the bottom perimeter edge of the pc tablet at the bottom clamping element,
- (e) pushing down on the pc tablet until the space between the top and bottom clamping elements increases enough as to accept the length of the height of the pc tablet, while said connector pulls said right and left legs towards each other,
- (f) catching the top perimeter edge of the pc tablet at the top clamping element,
- (g) releasing the push down force on the pc tablet allowing the left and right legs to resiliently move apart from each other biasing said bottom clamping element and pc tablet against said top clamping element securing the pc tablet therebetween,
- (h) optionally changing the orientation of the pc tablet from portrait to landscape and vice versa.

18. The method as defined in claim 17 wherein said top and bottom clamping elements are a wire hook, said wire hook comprising a front arm horizontally disposed and having two end portions, first and second side arms each having a first end portion defining a catch surface and normally extending from a corresponding one distal end of said front arm at least the length of the pc tablet's thickness, first and second vertical arms each having a top end portion normally extending from a second end portion of said side arms and having a bottom end portion defining a curl of predetermined diameter.

19. The method as defined in claim 18 wherein said frame comprises a resilient elongated member bent in a substantially "U"-shape, said connector comprising a string connecting said right and left legs and having its middle portion introduced through the curls of said bottom wire hook, a portion of the vertex of said "U"-shaped frame being introduced through the curls of said top wire hook, thereby allowing the bottom wire hook to be pushed down while the legs of the frame resiliently approach each other, and allowing the bottom wire hook to be lifted up by the separating legs when the push down force is released.

20. The method as defined in claim 19 wherein said string has two ends each forming a loop therein, a crimp sleeve holding each string loop, an anchor for anchoring each of the string loops to a corresponding one of each of the frame's side legs, said anchor being selected from the group consisting of flag ring terminals, double barrel crimp sleeves, and cable-ties.

* * * * *